United States Patent
Wan et al.

(10) Patent No.: US 11,335,006 B2
(45) Date of Patent: May 17, 2022

(54) IMAGE SEGMENTATION WITH ACTIVE CONTOUR

(71) Applicant: MIM SOFTWARE INC., Cleveland, OH (US)

(72) Inventors: Hanlin Wan, Cleveland Heights, OH (US); Paul Jacobs, Beachwood, OH (US); Jerimy Brockway, Hunting Valley, OH (US); Jonathan Piper, Orange, OH (US)

(73) Assignee: MIM Software, Inc., Cleveland, OH (US)

( * ) Notice: Subject to any disclaimer, the term of this patent is extended or adjusted under 35 U.S.C. 154(b) by 54 days.

(21) Appl. No.: 15/962,170

(22) Filed: Apr. 25, 2018

(65) Prior Publication Data
US 2019/0333225 A1   Oct. 31, 2019

(51) Int. Cl.
| | |
|---|---|
| *G06K 9/34* | (2006.01) |
| *G06T 7/149* | (2017.01) |
| *G06K 9/46* | (2006.01) |
| *G06T 7/00* | (2017.01) |
| *G06K 9/00* | (2022.01) |

(Continued)

(52) U.S. Cl.
CPC ............ *G06T 7/149* (2017.01); *G06K 9/0014* (2013.01); *G06K 9/00234* (2013.01); *G06K 9/34* (2013.01); *G06K 9/4604* (2013.01); *G06T 7/0012* (2013.01); *G06T 7/10* (2017.01); *G06T 7/60* (2013.01); *G06K 2009/366* (2013.01);
(Continued)

(58) Field of Classification Search
CPC ............ G06K 9/00127; G06K 9/0014; G06K 9/00234; G06K 9/34; G06K 9/342; G06K 9/4604; G06K 9/4638; G06K 9/48; G06K 9/50; G06K 2009/366; G06K 2009/485; G06K 2209/05; G06K 2209/051; G06K 2209/053; G06T 7/0012; G06T 7/10; G06T 7/11; G06T 7/12; G06T 7/143; G06T 7/149; G06T 7/181; G06T 7/187; G06T 7/194; G06T 7/60; G06T 7/62; G06T 7/70; G06T 2207/10072; G06T 2207/10081; G06T 2207/10088; G06T 2207/10104; G06T 2207/10116; G06T 2207/10132; G06T 2207/20092; G06T 2207/20096; G06T 2207/20101; G06T 2207/20112; G06T 2207/20116; G06T 2207/20152; G06T 2207/20156; G06T 2207/30004; G06T 2207/30096
USPC ....... 382/100, 128, 131–134, 154, 164, 173, 382/199, 203, 256, 258, 259; 128/922
See application file for complete search history.

(56) References Cited

U.S. PATENT DOCUMENTS

| | | | |
|---|---|---|---|
| 7,499,578 B2 | 3/2009 | Reeves et al. | |
| 7,519,209 B2 * | 4/2009 | Dawant | G06T 7/12 |
| | | | 382/128 |

(Continued)

*Primary Examiner* — Eric Rush
(74) *Attorney, Agent, or Firm* — Tucker Ellis LLP; Evan T. Perry (57) ABSTRACT

An image segmentation system is discloses that provides one or more possible contours of a feature of an image, in parallel, that respectively correspond to different interpretations of the image. First, a relatively large set of possible contours are generated in accordance with an image segmentation algorithm. Subsequently, this set of possible contours is reduced to a few candidates reflecting representative solutions corresponding to one or more desired applications.

22 Claims, 6 Drawing Sheets

(51) Int. Cl.
  *G06T 7/60*   (2017.01)
  *G06T 7/10*   (2017.01)
  *G06K 9/36*   (2006.01)

(52) U.S. Cl.
  CPC .............. *G06T 2207/20101* (2013.01); *G06T 2207/20112* (2013.01); *G06T 2207/20116* (2013.01)

(56) References Cited

U.S. PATENT DOCUMENTS

| | | | |
|---|---|---|---|
| 9,098,912 B2* | 8/2015 | Kriston | G06T 7/0014 |
| 9,142,184 B1* | 9/2015 | Tiwari | G06T 7/12 |
| 9,292,933 B2* | 3/2016 | Madabhushi | G06K 9/0014 |
| 9,418,420 B2 | 8/2016 | Brown | |
| 9,607,241 B2* | 3/2017 | Rivet-Sabourin | G06T 7/12 |
| 2008/0193006 A1* | 8/2008 | Udupa | G06T 7/174 |
| | | | 382/131 |
| 2009/0190815 A1* | 7/2009 | Dam | G06T 7/0012 |
| | | | 382/131 |
| 2009/0245638 A1* | 10/2009 | Collier | G06T 7/11 |
| | | | 382/173 |
| 2009/0252395 A1* | 10/2009 | Chan | G06T 7/0012 |
| | | | 382/131 |
| 2009/0252429 A1* | 10/2009 | Prochazka | G06T 7/194 |
| | | | 382/254 |
| 2010/0111396 A1* | 5/2010 | Boucheron | G06K 9/6231 |
| | | | 382/133 |
| 2014/0029827 A1* | 1/2014 | Frimmel | G06T 7/0012 |
| | | | 382/131 |
| 2015/0302601 A1* | 10/2015 | Rivet-Sabourin | G06T 7/12 |
| | | | 382/131 |
| 2015/0371392 A1* | 12/2015 | Coradi | G06T 7/12 |
| | | | 382/128 |
| 2016/0012604 A1 | 1/2016 | Firouzian et al. | |
| 2016/0070973 A1* | 3/2016 | Rivet-Sabourin | G06T 7/60 |
| | | | 382/199 |
| 2016/0093110 A1* | 3/2016 | Waschbusch | G06T 7/174 |
| | | | 382/131 |
| 2017/0039725 A1* | 2/2017 | Dror | G06T 7/12 |

* cited by examiner

IMAGE SEGMENTATION WITH ACTIVE CONTOUR

BACKGROUND OF THE INVENTION

1. Field of the Invention

This application relates generally to image segmentation and, more particularly, to systems and methods for automated segmentation of features in images based on primary and secondary considerations.

2. Description of Related Art

Image segmentation generally relates to partitioning an image into various sections. Typically, these sections serve to identify and isolate various objects and boundaries in the image. In some cases, image segmentation can fully separate an image into a background region and one or more foreground images. In other situations, the goal can be to identify a single feature in the image. In medical imaging, for instance, image segmentation, or contouring, can be employed to locate and identify a lesion or other abnormality and distinguish such a feature from healthy tissue in a medical image, which is useful for various medical applications.

For example, radiation therapy seeks to deliver a large amount of radiation to a tumor while minimizing a dose received by surrounding healthy tissue. An accurate delineation of the tumor facilitates optimally planning the delivery of radiation to achieve this goal. Conventionally, this delineation or contouring of the tumor is a manual process performed by a physician. In addition to being a laborious task, manual contouring introduces error and/or inconsistency to resulting contours due to the observer.

BRIEF SUMMARY OF THE INVENTION

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of the summary is to present some concepts related to some exemplary non-limiting embodiments in a simplified form as a prelude to the more detailed description of the various embodiments that follow.

In various, non-limiting embodiments, an image segmentation system provides automated determination of one or more contours of an object in an image without extensive user configuration of parameters in a trial-and-error manner. An automated or semi-automated image segmentation technique or algorithm is employed to generate multiple potential solutions (i.e. contours of the object or portions thereof). A secondary algorithm or technique is applied to the multiple potential solutions to reduce the number of possible solutions and select better solutions according to some criteria. This reduced set of best contours of the object are output to a user. The user reviews and interacts with these contours in order to select a final segmentation of the object for a desired application.

These and other embodiments are described in more detail below.

BRIEF DESCRIPTION OF THE DRAWING

Various non-limiting embodiments are further described with reference the accompanying drawings in which.

DETAILED DESCRIPTION OF THE INVENTION

General Overview

As discussed in the background, image segmentation enables delineation of features (e.g., anatomy, lesions, tumors, various other abnormalities, etc.) in medical images to facilitate planning and execution of medical procedures. Further, accurate delineation of abnormalities enables tracking abnormality volume during treatment to gauge treatment progress and efficacy. Often, feature delineation (e.g., contouring) is performed manually by a physician in a time-consuming and inconsistent process. With manual contouring, some image modalities can introduce even more variability. For example, with positron emission tomography (PET) images, boundaries are often fuzzy and displayed intensities significantly depend on a contrast window and level utilized to view the images. Even when semi-automated tools are utilized to aid in contouring, wide variations in results still occur. For instance, many segmentation algorithms typically rely on fine tuning a set of parameters to achieve an appropriate segmentation for a given task. An optimal set of parameters suitable for a particular application, however, is not intuitive and highly image dependent. Thus, as the selected parameters determine the result, large variations in final segmentation still occur even when using conventional automatic or semi-automatic segmentation algorithms.

In various, non-limiting embodiments, a system and associated methods are provided for image segmentation. To reduce effects of initial parameters on an accuracy and consistency of a final segmentation, a two-pass or two-step technique is utilized to generate a set of candidate segmentations. A relatively large set of possible contours of a feature in an medical image are generated in accordance with an image segmentation algorithm. In a second pass, this set of possible contours is reduced to a few candidates reflecting the best solutions (e.g., the best contour of the feature) for one or more desired applications.

For the second pass, a second algorithm or secondary information is leveraged to evaluate or rank each contour of the set of possible contours. Some predetermined criteria can be applied to select the candidate solutions based on the evaluation. For instance, during the second pass, a value representative of a fitness metric is determined for each contour. The contours having respective values satisfying the predetermined criteria are accepted as candidate solutions, while contours with unacceptable values (according to the criteria) are discarded. The candidate solutions are presented to a user for selection of a final segmentation for a desired purpose. Alternatively, the final segmentation is selected based on a measure of contour size. For instance, a predetermined contour size (e.g. a maximum diameter) can be utilized for the selection of the final segmentation. The candidate solutions that a minimum distance from the predetermined measure of contour size (i.e., closest in size) are selected as the final segmentations, for example. The predetermined measure of contour size can be user indicated.

While the above example describes two separate and discrete steps or passes to the image segmentation technique, such description is illustrative to facilitate understanding and it is to be appreciated that actual implementation of the described technique does not rely on separate and individual performance of each part. For instance, the second pass can be implicitly executed when each of the large number of possible contours are generated. The image segmentation algorithm can be configured converge on an optimal set of solutions as opposed to a single solution based on some convergence criteria. Still further, it is to be appreciated that the two-pass or two-step technique can be reduced to a single pass. For instance, the set of possible contours generated with the image segmentation algorithm can be the candidate solutions presented to the user for selection. In this instance, the image segmentation algorithm can generate the set of possible contours with or without some evaluation, ranking, or optimization built-in to the algorithm as described above.

In one embodiment, a system is provided that includes a processor coupled to memory storing computer-executable instructions. When executed by the processor, the instructions configure the processor to: generate a set of contours of a feature in an image in accordance with an image segmentation technique; select a set of candidate solutions from the set of contours based on secondary information; and output at least one contour from the set of candidate solutions as a final segmentation of the feature in the image.

According to an example, the processor can be further configured to obtain initialization information and generate the set of contours in accordance with the image segmentation technique based on the initialization information. The initialization information can include a user selected point of the image within the feature. The initialization information can also include an initial set of parameters for the image segmentation technique.

The processor can be further configured to receive a user selection of the final segmentation of the feature from the set of candidate solutions. According to another example, the processor can be further configured to: for each candidate solution from the set of candidate solutions, determine a length of the feature, as contoured in the candidate solution, along a predetermined axis; and select the final segmentation based on respective determined lengths for each candidate solution and a predetermined measured length of the feature. For instance, the processor can be further configured to discard candidate solutions having respective determined lengths which exceed a threshold difference as compared to the predetermined measured length. In addition, the processor can be further configured to select a candidate solution having a determined distance closest to the predetermined measured length as the final segmentation.

In further examples, the processor can be configured to refine each contour from the set of candidate solutions. The processor can be configured to generate the set of contours in accordance with an active contour segmentation technique. The set of contours can include respective results following one or more iterations according to the image segmentation technique.

In one example, the secondary information can include image characteristics. For instance, the processor can be configured to determine, for each contour, an average distance between each point on the contour and a nearest point of a potential boundary of the feature according to the image characteristics. In another example, the processor can be configured to determine, for each contour of the set of contours, a mean distance between each point on the contour and a nearest image point corresponding to a local maximum of an image gradient. In this example, the processor can be configured to select, as candidate solutions, contours that correspond to local extrema of the mean distance when plotted for all contours of the set of contours. The processor can be configured to select, as a default candidate solution, a contour having a mean distance which is closest to zero.

According to further examples, the processor can be configured to generate the set of contours through application of a plurality of image segmentation techniques. The processor may also be configured to generate the set of contours through application of the image segmentation technique with different sets of parameters.

According to another aspect, a method for segmenting a medical image is described. The method includes generating a set of contours for a feature of an image through application of an image segmentation technique. The method also includes applying a secondary criterion to the set of contours to select a set of candidate solutions. The method can further include displaying the contours of the set of candidate solutions to a user for selection of a final segmentation. The image segmentation technique can be an active contour technique.

In one example, the method can also include receiving, from the user, an initialization point of the image for the image segmentation technique, wherein the initialization point is located within the feature of the image. In addition, the method can include refining a boundary of each contour of the set of candidate solutions based on image properties.

In another example, generating the set of contours can include iterating, according to image segmentation technique, until convergence; and adding a respective result from each iteration of the image segmentation technique to the set of contours. In yet another example applying the secondary criterion can include: determining, for each contour of the set of a contours, a metric specifying a fitness of the contour; and selecting contours, for inclusion in the set of candidate solutions, having associated metrics satisfying a predetermined condition. Further to this example, the metric is a mean distance of each point of the contour to a nearest local maximum of an image gradient associated with the image and the predetermined condition for selection is a mean distance closest to zero within a given subset of similar contours from the set of contours. The predetermined condition for selection is a local maximum of the mean distance when plotted versus iteration indices.

In yet another embodiment, a computer-readable storage medium is described. The computer-readable storage medium stores computer-executable instructions that, when executed by a processor, configure the processor to: obtain an initialization point on a medical image as user input, the initialization point being located in a feature of the medical image to be segmented; generate a set of contours with an active contour technique for the feature of the medical image, wherein each contour in the set corresponds to respective states of an evolving contour of the feature following each iteration of the active contour technique until convergence; reduce the set of contours to a set of candidate segmentations based on a secondary metric determined for each contour of the set of contours; and display contours from the set of candidate segmentation to a user for selection of a final segmentation of the feature.

In an example, the computer-executable instructions stored on the computer-readable storage medium further configure the processor to determine, for each contour of the set of contours, a mean distance between each point of the contour and a nearest local maximum of an image gradient for the medical image. In another example, the computer-executable instructions stored on the computer-readable storage medium further configure the processor to identify local maxima on a plot of respective mean distances versus iteration index and to add contours corresponding to the local maxima identified to the set of candidate segmentations.

An overview of some embodiments of an improved image segmentation technique has been presented above. As a roadmap for what follows next, two-pass image segmentation is described in more detail. Afterwards, an exemplary computing device and computing environment, in which such embodiments and/or features described above can be implemented, are described. The above noted features and embodiments will be described with reference to the drawings, wherein like reference numerals are used to refer to like elements throughout.

Two-Pass Image Segmentation

As mentioned above, in various embodiments, an improved image segmentation technique to produce accurate and consistent segmentations can involve generation of a relatively large number of possible contours, which are subsequently evaluated for fitness to select a few candidate solutions.

Figure 1:
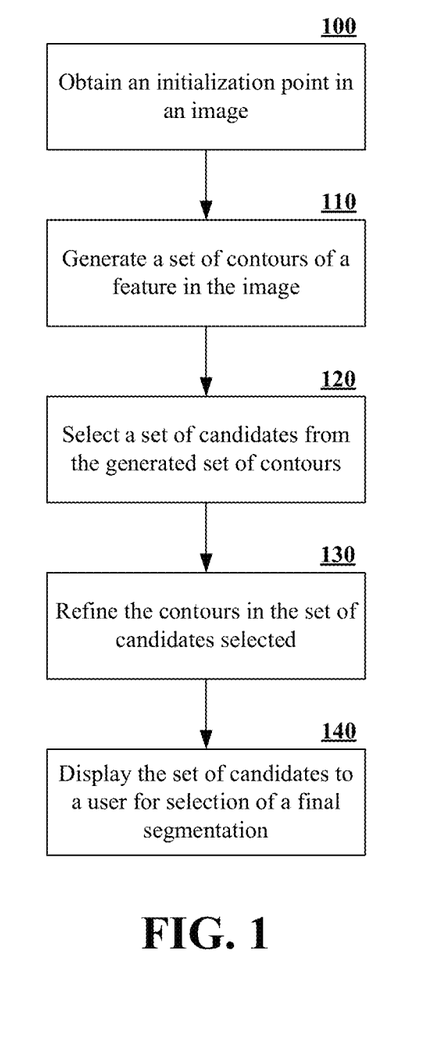
FIG. 1 is a flow diagram of an exemplary, non-limiting embodiment for an image segmentation technique according to one or more aspects.

FIG. 1 shows a flow diagram depicting an exemplary, non-limiting embodiment for an image segmentation technique. As described above, as opposed to a conventional segmentation approach which generates a single solution (i.e., a convergence of an algorithm), the image segmentation technique shown in FIG. 1 provides one or more candidate solutions corresponding multiple potential interpretations of an image. That is, the image segmentation technique disclosed herein reduces effects of initial parameter selection on a final segmentation result so as to eliminate extensive trial-and-error in connection with obtaining a suitable contour for a desired purpose.

The image segmentation technique starts at reference numeral 100 where an initialization point is obtained. The initialization point is a pixel or voxel of an image having a feature to be delineated. According to one aspect, the point is user-selected and may lie within an expected contour. In other words, the initialization point corresponds to a pixel or voxel of the feature to be delineated. The initialization point operates as a seed for the generation of the initial set of possible contours.

Alternatively, as opposed to the initialization point being a single point, more robust initialization information can be obtained such as an initial curve. For instance, a user can draw a rough approximation of a desired contour either inside or outside a boundary of the feature in the image. When an image segmentation algorithm is executed, this initial curve evolves to generate the one or more possible contours forming the initial set of solutions. Further still, the initialization information can be information specifying a bounding region (i.e., an area of image containing the feature to be delineated) to focus the generation of the initial set of possible contours to a particular portion of the image. The initialization can also be the output of an automatic algorithm, such as an algorithm optimized or trained to identify a feature of interest in an image rather than accurately and/or completely segment the feature.

At 110, a set of contours of the feature in the image are generated. This set of contours, according to an aspect, represents an initial set of possible contours of the feature. An image segmentation algorithm is employed to generate the set of contours based on the initialization point.

In one exemplary embodiment described herein, an active contouring algorithm is utilized for segmentation. An active contouring algorithm can be an iterative algorithm that, in some examples, evolves a curve by minimizing an energy functional based on image intensity data. The energy functional is defined such that its minimum corresponds to a curve having predetermined properties. For example, the energy functional can have a minimum when the curve matches a boundary of an object to be segmented. A level set representation of the evolving curve is defined such the level set function is zero at the boundary of the curve. A partial differential equation, derived from the level set function and the energy functional, can be solved to determine the curve (e.g., minimize the energy functional). A discretized and linearized approximation of the partial differential equation can be solved iteratively until convergence.

More specifically, to generate the set of contours based on the initialization point, a variation of the Chan-Vese active contouring technique can be utilized. This technique seeks to separate a target (e.g., the feature to be delineated) from a background by minimizing intensity variances among voxels inside a contour and among voxels outside the contour. Effectively, this technique determines a suitable threshold value to separate voxels of the target from the background. Given that some features may not be homogenous, a localization term can be introduced so that intensity variances are calculated only for voxels in a region around a boundary point (e.g. points of the evolving curve).

The level set function evolves until convergence (i.e. the energy functional is minimized). That is, as the contour evolves, the curve expands outward from the initialization or seed point. Conventionally, a final state of the curve (contour) at convergence is utilized as a final segmentation. As mentioned above, however, this final state can be highly dependent on initial parameter selection. Thus, according to one aspect, a state of the contour of each iteration is considered as a possible solution and added to the initial set of possible contours. It is to be appreciated that the initial set of possible contours is not limited to respective contour states following each iteration. For instance, the set of possible contours can correspond to respective solutions generated by the segmentation algorithm with different sets of parameters. The set of possible contours can also include solutions generated from different segmentation algorithms. While an active contour algorithm is described above, it is to be appreciated that other algorithms such as, but not limited to, graph cuts, region growing, thresholding, clustering, edge detection, or the like can be employed with the aspects described herein. Moreover, the initial set of possible contours can include various iterations of algorithms executed with disparate sets of parameters.

After generation of the initial set of contours, each contour is evaluated, at 120, in order to select a set of candidate solutions. As the contour evolves during iterations of the segmentation algorithm, some states, including intermediate states, may be suitable segmentations for certain goals. Accordingly, the second step or second pass of the image segmentation technique described herein enables identification and selection of these suitable segmentations without the burden of experimentally configuring parameters.

In one example, a second algorithm is executed against or secondary considerations are applied to the initial set of contours to generate the set of candidate solutions. For this evaluation step, a metric or fitness value can be determined for each contour of the initial set. A predetermined criterion is employed to select contours for inclusion in the set of candidate solutions based on respective metrics or fitness values. That is, contours having fitness values satisfying predetermined conditions can be selected as candidate solutions. In this way, the selection criteria operates to reduce the initial set of contours to relatively smaller number of candidate solutions corresponding to contours applicable for various purposes. However, as described above, it is to be appreciated that an entirety of the initial set of contours can be output as the set of candidate solutions without the second step or second pass. In such cases, the first pass may implicitly rank or evaluate contours with built-in criteria without an explicit second step. Alternatively, ranking or evaluation can be avoid altogether such that solutions at each iteration are output for selection.

According to one specific embodiment of a second pass technique, the metric or fitness value can be a mean distance between each point on the surface of a contour and a nearest point corresponding to a local maximum of an image gradient. Intuitively, a mean distance close to zero indicates that the contour lie near a maximum gradient surface. This fitness value is suitable for PET and other medical images where an acceptable contour is expected to closely follow maximum gradient surfaces.

After each contour of the initial set is evaluated and assigned respective values, one or more contours are identified as candidate solutions according to a selection criterion. As mentioned above, a suitable contour for a feature on a PET image is expected to lie near surfaces of maximum gradient. In this example, the selection criterion can be contours having fitness values (i.e. mean distances) having magnitudes within a threshold distance from zero.

When the initial set includes contour states after respective iterations, contours of successive iterations may be very similar and have similar fitness values. To avoid cluttering the set of candidate solutions with similar contours, the selection criterion can be configured to select one candidate from a subset of similar contours. For instance, the fitness values (e.g. mean distances) can be plotted versus an iteration index. Iterations corresponding to extrema of the plot (e.g. maxima or minima depending on sign) may be selected as candidate solutions. Further, the extrema identified on the plot may be discarded if the mean distance for that iteration is beyond a threshold distance from zero. According to another example, various subsets of contours ranging over the set of contours can be respectively evaluated as a group. The contour from each subset having a fitness value satisfying a predetermined condition can be selected as a candidate solution. For instance, the contour with a mean distance closest to zero in each subset can be selected. The subsets evaluated as groups can be overlapping or non-overlapping.

Following selection of the set of candidate solutions, post-processing can be performed on each candidate solution. In some cases, various effects can be introduced during image acquisition such that the imaged feature differs from a physical geometry of the feature in reality. To account for these effects, the contours in the set of candidate solutions can be refined at 130. For example, PET image acquisition often introduces partial volume effects. An edge of a feature (i.e. tumor or other abnormality) in the image is expected to lie close to a maximum gradient surface, but due to smoothing, this is not always the case. Accordingly, the boundaries of each contour can be shifted to accommodate these known effects. Specifically, for PET images and associated contours, a volume correction curve can be applied to each contour to refine the edges.

At 140, the solutions from the set of candidate solutions are output to display to a user. The solutions can be displayed together, side-by-side for example, or displayed individually such that the user can scroll through solutions or otherwise switch an actively displayed solution to any solution in the set of candidates. According to one aspect, the contour having the smallest mean distance value can be selected as a default solution and initially displayed to the user. The user, after reviewing the solutions, can select one or more solutions as final segmentations.

In an alternative embodiment, distances can be determined along an axis of a defined (i.e. by an operator) longest axis of the object to be segmented. Candidate solutions associated with determined distances exceeding a threshold difference from a known measured length of the object along the defined axis may be discarded. Further, the candidate solution(s) with a determined length, as segmented, which is closest to the known measured length can be selected as the final segmentation without additional user input.

The set of candidate solutions enables the user to more fully explore a segmentation problem. For an easily segmented feature, the set of candidate solutions may only include a single contour. In cases where image data is ambiguous, however, the set of candidate solutions can include solutions in accordance with various differing interpretations of the underlying data. For example, if a feature includes multiple lobes, a hot spot, a necrotic core, and/or high activity in the background, these aspects can be difficult to disambiguate automatically. Further, any disambiguation result may not conform to an intent of a physician. For a necrotic core or hot spot, an internal boundary, between the core and a remainder of the tumor, can possess a higher gradient surface than the boundary between the tumor and the background. The image segmentation technique described in FIG. 1 generates a solution contouring the inner hot spot and another solution contouring the entire tumor. Accordingly, the image segmentation technique described herein enables the user to simply select a solution corresponding to a particular hypothesis and to avoid detailed voxel-by-voxel comparisons between similar solutions. Moreover, these solutions are generated without extensive configuration to individually drive the segmentation algorithm to converge on these different solutions.

Figure 2:
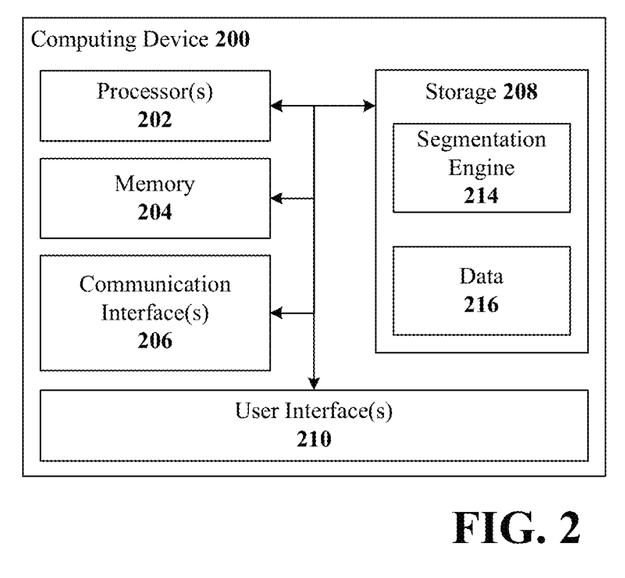
FIG. 2 is a schematic block diagram of an exemplary, non-limiting embodiment for implementing the image segmentation technique of FIG. 1.

Turning to FIG. 2, illustrated is a schematic block diagram of an exemplary, non-limiting embodiment for a computing device 200 implementing the image segmentation technique of FIG. 1. As shown in FIG. 2, computing device 200 includes one or more processor(s) 202 configured to executed computer-executable instructions such as instructions composing a segmentation engine 214. Such computer-executable instructions can be stored on one or more computer-readable media including non-transitory, computer-readable storage media such as storage 208 and/or memory 204. For instance, storage 208 can include non-volatile storage to persistently store segmentation engine 112 and/or data 212 (e.g., image data, contour information, fitness values, configuration information, working data, etc.). Memory 204 can also include volatile storage that stores segmentation engine 213 and other data 212 (or portions thereof) during execution by processor 202.

Computing device 200 includes a communication interface 206 to couple computing device 200 to various remote systems (e.g. an image data store, an imaging apparatus, etc.). Communication interface 206 can be a wired or wireless interface including, but not limited, a WiFi interface, an Ethernet interface, a fiber optic interface, a cellular radio interface, a satellite interface, etc. An I/O interface 210 is also provided to couple computing device 200 to various input and output devices such as displays, touch screens, keyboards, mice, touchpads, etc. By way of example, I/O interface 210 can include wired or wireless interfaces such as, but not limited to, a USB interface, a serial interface, a WiFi interface, a short-range RF interface (Bluetooth), an infrared interface, a near-field communication (NFC) interface, etc.

Figure 3:
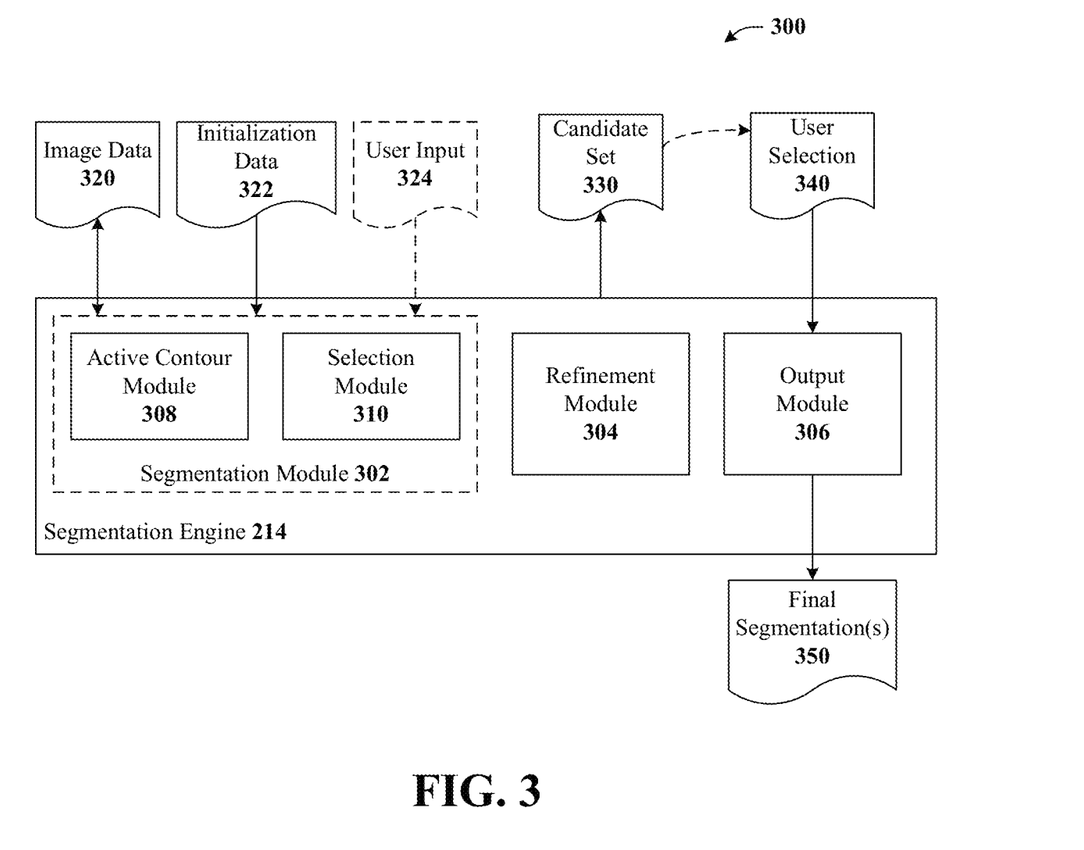
FIG. 3 is a schematic block diagram of an exemplary, non-limiting embodiment of an image segmentation system utilizing the image segmentation technique of FIG. 1.

Referring to FIG. 3, an exemplary, non-limiting embodiment of an image segmentation system 300 is illustrated. System 300 includes a segmentation engine 214, which as described above, may be implemented as computer-executable instructions carried out by a processor. As shown in FIG. 3, segmentation engine 112 can include various functional modules implemented by computer-executable instructions. The modules can include a segmentation module 302, a refinement module 304, and an output module 306.

Segmentation module 302 receives image data 320 associated with a medical image having a feature (e.g., a tumor, lesion, other abnormalities, and/or healthy tissue) to be delineated as disclosed herein. For example, segmentation module 302 can load image data 320 from storage, local or remote, based on a selection included in user input 324. Segmentation module 302, according to an aspect, includes an active contour module 308 and a selection module 310 to implement a two-pass segmentation technique. Active contour module 308 executes an iterative segmentation algorithm on image data 320 in accordance with initialization data 322. Initialization data 322 can include parameter sets configuring the segmentation algorithm for respective image modalities, feature types, or desired medical application. The initialization data 322 can also include a seed point within the image data 320 or an initial contour to be evolved. The initialization data 322 can be selected or provided by user input 324.

Based on the image data 320 and initialization data 322, the active contour module 308 executes an iterative segmentation algorithm that evolves a curve to convergence. After each iteration, the active contour module 308 records a state of the curve (i.e. the contour) to an initial set of possible solutions. After convergence of the algorithm, the initial set of possible solutions is evaluated by a selection module 310 to reduce a full corpus of solutions to a set of candidate solutions. The set of candidate solutions is generated based on selection criteria that operates to select segmentations satisfying predetermined conditions. In one aspect, the selection criteria is broad enough to enable selection of varied segmentations corresponding to different interpretations of the image data 320 while being sufficiently restrictive to avoid selecting multiple similar segmentations. According to an example, the selection module 310 selects contours of the initial set having mean distances to a maximum gradient surface which are closest to zero. More specifically, the selection module 310 can select a single contour with the smallest mean distance among a group of similar contours. The group of similar contours can be a subset of contours conforming to a particular hypothesis matching the underlying image data 320.

Refinement module 304 performs post-processing on each contour selecting by selection module 302 to account for various effects introduced though image acquisition depending on a modality. After post-processing, a candidate set 330 of one or more segmentations of the feature in image data 320 is output. Each segmentation of candidate set 330 can be displayed to a user for selection 340 of a final segmentation 350.

Figure 4:
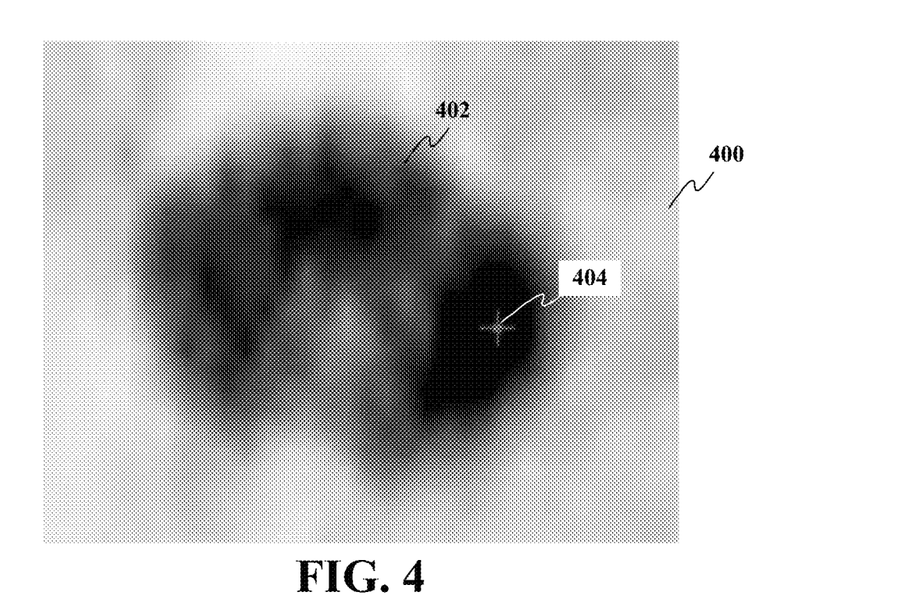
FIG. 4 is an example image with an object to be contoured in accordance with one or more aspects.
Figure 5:
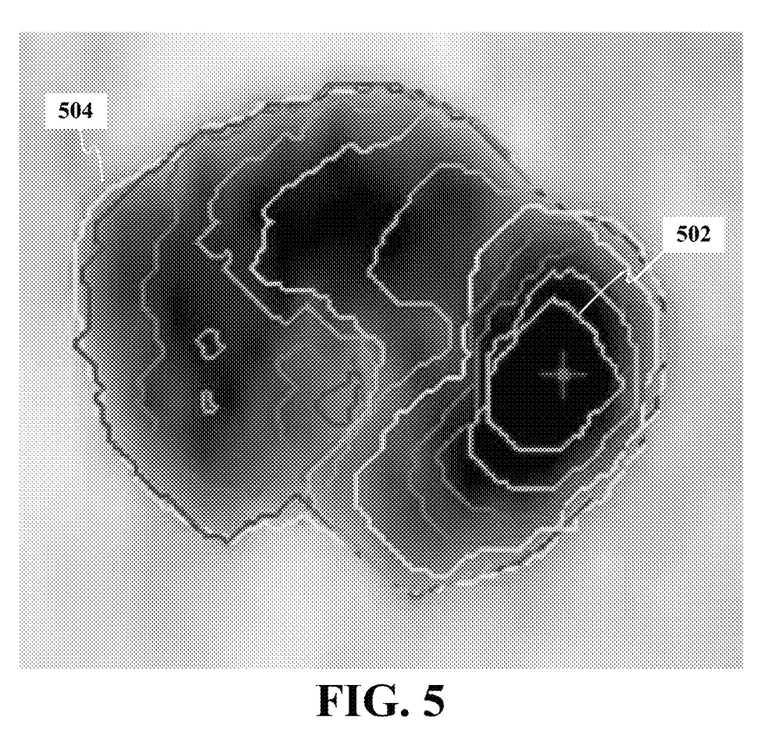
FIG. 5 depicts a set of contours generated for a feature of an image according to one or more aspects of the image segmentation technique disclosed herein.

Turning now to FIG. 4, an example image 400 is depicted which contains a feature 402 to be delineated in accordance with the image segmentation technique disclosed herein. A seed point 404 can be selected as an initialization point form which possible segmentations or contours are generated. FIG. 5 indicates various states of an evolving contour for a plurality of iterations of a segmentation algorithm. These states, according to aspect, are included in a set of possible solutions that includes a contour state 502 following a first iteration, one or more intermediate states, and a state 504 of the contour at converged (e.g. following a final iteration).

Figure 6:
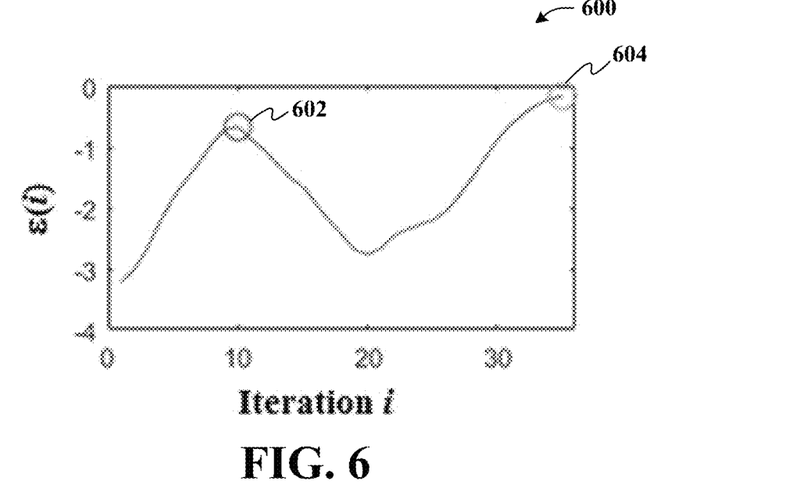
FIG. 6 is an illustration of an exemplary, non-limiting technique for selecting the best candidates from the set of contours shown in FIG. 5.
Figure 7:
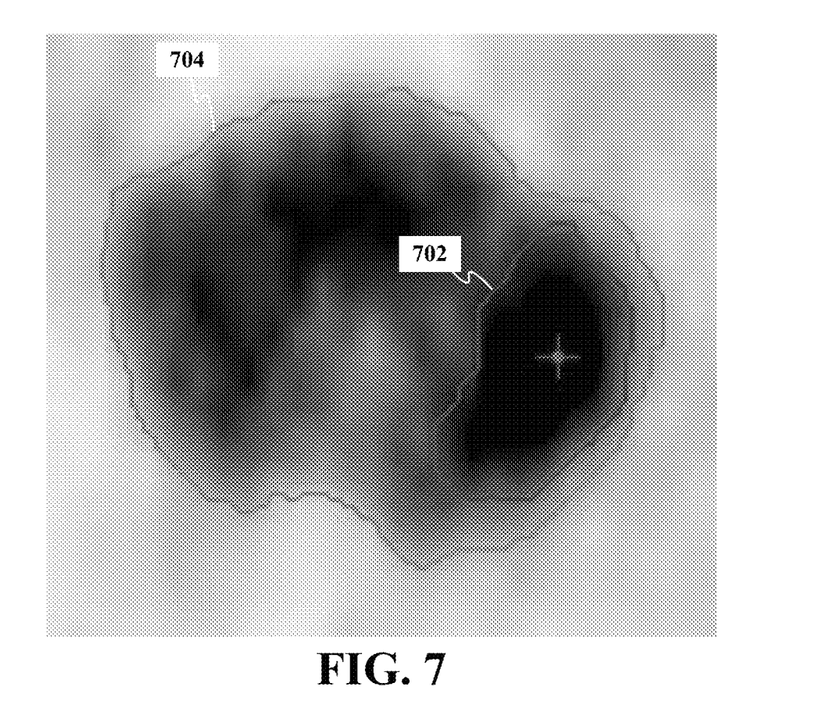
FIG. 7 illustrates candidate contours of a feature of an image selected from the set of contours shown in FIG. 5.

The set of possible solutions is reduced to a set of candidate solutions based on selection criteria for evaluating each contour and identifying contours satisfying particular conditions. FIG. 6 depicts an exemplary technique for identifying the best candidates form the set of possible solutions. As shown in graph 600, for each contour, a fitness value can be determined and plotted against an iteration number or index. In one example, the fitness value can be a mean distance of the contour to a maximum gradient surface of the image. Local extrema 602, 604 of plot 600 correspond to contours providing a closest fit to maximum gradient surfaces among respective subsets of similar contours. In particular, contour 702 in FIG. 7 corresponds to local extrema 602 and contour 704 in FIG. 7 corresponds to extrema 604. As shown in FIG. 7, contour 702 delineates a right lobe portion of the overall feature and contour 704 delineates an entirety of the feature relative to a background. Depending on an intent of the physician, or a desired procedure to be performed, one of contour 702, 704 may be more suitable over the other. Conventionally, to achieve contour 702 directly with the segmentation algorithm, over contour 704, can require extensive experimentation of parameters to prioritize convergence to contour 702 instead of contour 704. However, the image segmentation technique disclosed herein generates both possibilities simultaneously to enable a user to select the contour best suited for a desired purpose.

Exemplary Computing Device

As mentioned, advantageously, the techniques described herein can be applied to any device where it is desirable to provide one or more image segmentations in parallel which respectively conform to varying interpretations of image data. It can be understood, therefore, that handheld, portable and other computing devices and computing objects of all kinds are contemplated for use in connection with the various embodiments of a registration visualization system. Accordingly, the below general purpose computer described below in FIG. 8 is but one example of a computing device.

Embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 8:
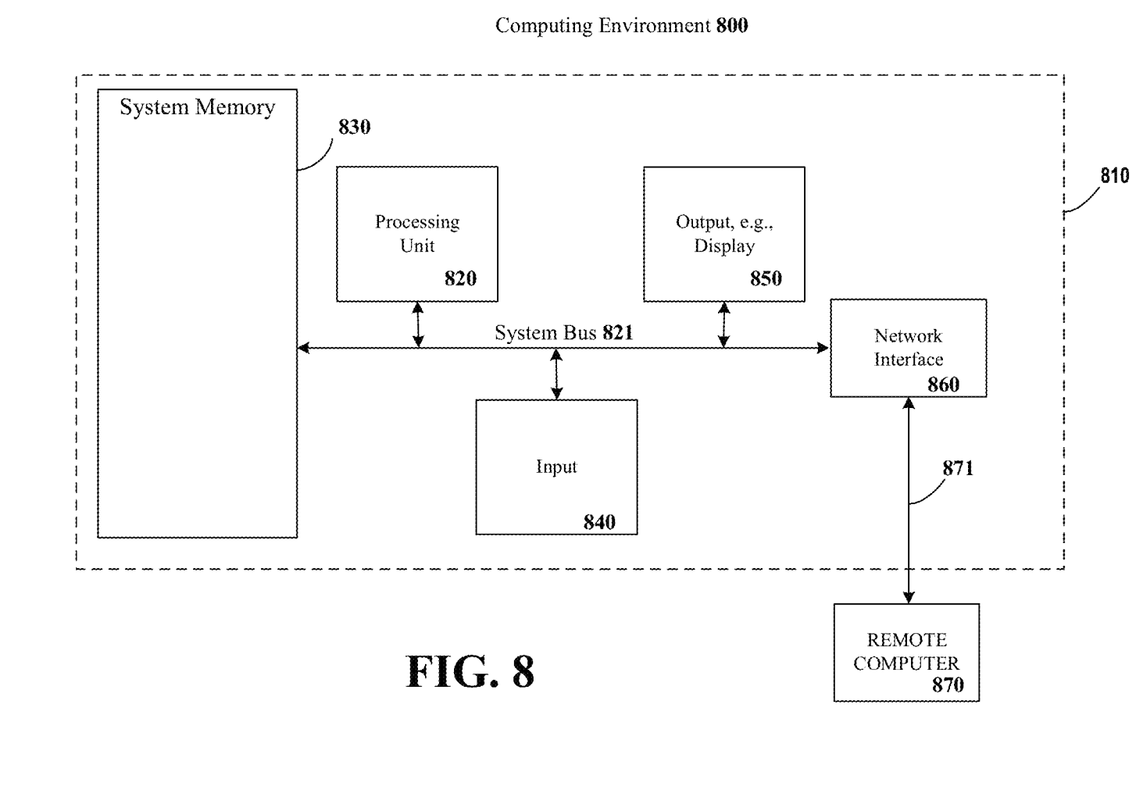
FIG. 8 is a block diagram representing an exemplary, non-limiting computing system or operating environment in which one or more aspects of various embodiments described herein can be implemented.

FIG. 8 thus illustrates an example of a suitable computing system environment 800 in which one or aspects of the embodiments described herein can be implemented, although as made clear above, the computing system environment 800 is only one example of a suitable computing environment and is not intended to suggest any limitation as to scope of use or functionality. In addition, the computing system environment 800 is not intended to be interpreted as having any dependency relating to any one or combination of components illustrated in the exemplary computing system environment 800.

With reference to FIG. 8, an exemplary device for implementing one or more embodiments includes a general purpose computing device in the form of a computer 810. Components of computer 810 may include, but are not limited to, a processing unit 820, a system memory 830, and a system bus 822 that couples various system components including the system memory to the processing unit 820.

Computer 810 typically includes a variety of computer readable media and can be any available media that can be accessed by computer 810. The system memory 830 may include computer storage media in the form of volatile and/or nonvolatile memory such as read only memory (ROM) and/or random access memory (RAM). By way of example, and not limitation, system memory 830 may also include an operating system, application programs, other program modules, and program data. According to a further example, computer 810 can also include a variety of other media (not shown), which can include, without limitation, RAM, ROM, EEPROM, flash memory or other memory technology, compact disk (CD) ROM, digital versatile disk (DVD) or other optical disk storage, or other tangible and/or non-transitory media which can be used to store desired information.

A user can enter commands and information into the computer 810 through input devices 840. A monitor or other type of display device is also connected to the system bus 822 via an interface, such as output interface 850. In addition to a monitor, computers can also include other peripheral output devices such as speakers and a printer, which may be connected through output interface 850.

The computer 810 may operate in a networked or distributed environment using logical connections to one or more other remote computers, such as remote computer 870. The remote computer 870 may be a personal computer, a server, a router, a network PC, a peer device or other common network node, or any other remote media consumption or transmission device, and may include any or all of the elements described above relative to the computer 810. The logical connections depicted in FIG. 8 include a network 872, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to implement an image segmentation system.

Also, there are multiple ways to implement the same or similar functionality, e.g., an appropriate API, tool kit, driver code, operating system, control, standalone or downloadable software objects, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

As utilized herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the term "exemplary" is intended to mean "serving as an illustration or example of something."

Illustrative embodiments have been described, hereinabove. It will be apparent to those skilled in the art that the above devices and methods may incorporate changes and modifications without departing from the general scope of the claimed subject matter. It is intended to include all such modifications and alterations within the scope of the claimed subject matter. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor coupled to memory storing computer-executable instructions that, when executed by the processor, configure the processor to:
generate a set of contours of a feature in an image in accordance with an image segmentation technique;
select a set of candidate solutions from the set of contours based on secondary information, wherein to select the set of candidate solutions, the processor is further configured to determine, for each contour of the set of contours, a mean distance between each point on the contour and a nearest image point corresponding to a local maximum of an image gradient and select, as candidate solutions, contours that correspond to local extrema of the mean distance when plotted for all contours of the set of contours; and
output a final segmentation of the feature in the image selected from the set of candidate solutions.

2. The system of claim 1, wherein the processor is further configured to:
obtain initialization information; and
generate the set of contours in accordance with the image segmentation technique based on the initialization information.

3. The system of claim 2, wherein the initialization information includes a user selected point of the image within the feature.

4. The system of claim 2, wherein the initialization information includes an initial set of parameters for the image segmentation technique.

5. The system of claim 1, wherein the processor is further configured to:
   for each candidate solution from the set of candidate solutions, determine a length of the feature, as contoured in the candidate solution, along a predetermined axis; and
   select the final segmentation based on respective determined lengths for each candidate solution and a predetermined measured length of the feature.

6. The system of claim 5, wherein the processor is further configured to discard candidate solutions having respective determined lengths which exceed a threshold difference as compared to the predetermined measured length.

7. The system of claim 5, wherein the processor is further configured to select a candidate solution having a determined distance closest to the predetermined measured length as the final segmentation.

8. The system of claim 1, wherein the processor is further configured to refine each contour from the set of candidate solutions.

9. The system of claim 1, wherein the processor is further configured to generate the set of contours in accordance with an active contour segmentation technique.

10. The system of claim 1, wherein the set of contours includes respective results following one or more iterations according to the image segmentation technique.

11. The system of claim 1, wherein the secondary information includes image characteristics.

12. The system of claim 11, wherein the processor is further configured to determine, for each contour, an average distance between each point on the contour and a nearest point of a potential boundary of the feature according to the image characteristics.

13. The system of claim 1, wherein the processor is further configured to select, as a default candidate solution, a contour having a mean distance which is closest to zero.

14. The system of claim 1, wherein the processor is further configured to generate the set of contours through application of a plurality of image segmentation techniques.

15. The system of claim 1, wherein the processor is further configured to generate the set of contours through application of the image segmentation technique with different sets of parameters.

16. The system of claim 1, wherein the processor is further configured to receive a user selection of the final segmentation of the feature from the set of candidate solutions.

17. A method for segmenting a medical image, comprising:
   generating a set of contours for a feature of an image through application of an image segmentation technique;
   applying a secondary criterion to the set of contours to select a set of candidate solutions, wherein applying the secondary criterion includes:
      determining, for each contour of the set of contours, a metric specifying a fitness of the contour, the metric is a mean distance of each point of the contour to a nearest local maximum of an image gradient associated with the image; and
      selecting contours, for inclusion in the set of candidate solutions, having associated metrics satisfying a predetermined condition, the predetermined condition for selection comprises (1) a mean distance closest to zero within a given subset of similar contours from the set of contours and (2) a local maximum of the mean distance when plotted versus iteration indices; and
   displaying the contours of the set of candidate solutions to a user for selection of a final segmentation.

18. The method of claim 17, further comprising receiving, from the user, an initialization point of the image for the image segmentation technique, wherein the initialization point is located within the feature of the image.

19. The method of claim 17, further comprising refining a boundary of each contour of the set of candidate solutions based on image properties.

20. The method of claim 17, wherein generating the set of contours comprises:
   iterating, according to the image segmentation technique, until convergence; and
   adding a respective result from each iteration of the image segmentation technique to the set of contours.

21. The method of claim 17, wherein the image segmentation technique is an active contour technique.

22. A non-transitory computer-readable storage medium having stored thereon computer-executable instructions that configure a processor to:
   obtain an initialization point on a medical image as user input, the initialization point being located in a feature of the medical image to be segmented;
   generate a set of contours with an active contour technique for the feature of the medical image, wherein each contour in the set of contours corresponds to respective states of an evolving contour of the feature following each iteration of the active contour technique until convergence;
   reduce the set of contours to a set of candidate segmentations based on a secondary metric determined for each contour of the set of contours, wherein the computer-executable instructions to reduce the set of contours configure the processor to:
      determine, for each contour of the set of contours, a mean distance between each point of the contour and a nearest local maximum of an image gradient for the medical image;
      identify local maxima on a plot of respective mean distances versus iteration index; and
      add contours corresponding to the local maxima identified to the set of candidate segmentations; and
   display contours from the set of candidate segmentations to a user for selection of a final segmentation of the feature.

* * * * *